(12) United States Patent
Ishibashi et al.

(10) Patent No.: US 11,142,030 B2
(45) Date of Patent: Oct. 12, 2021

(54) PROTECTION STRUCTURE FOR VEHICLE SUSPENSION DEVICE

(71) Applicant: KAWASAKI JUKOGYO KABUSHIKI KAISHA, Hyogo (JP)

(72) Inventors: Kazuki Ishibashi, Hyogo (JP); Yusuke Nakashima, Kobe (JP)

(73) Assignee: KAWASAKI JUKOGYO KABUSHIKI KAISHA, Hyogo (JP)

(*) Notice: Subject to any disclaimer, the term of this patent is extended or adjusted under 35 U.S.C. 154(b) by 5 days.

(21) Appl. No.: 16/726,570

(22) Filed: Dec. 24, 2019

(65) Prior Publication Data
US 2021/0188027 A1 Jun. 24, 2021

(51) Int. Cl.
B60G 3/06 (2006.01)

(52) U.S. Cl.
CPC .......... *B60G 3/06* (2013.01); *B60G 2204/149* (2013.01); *B60G 2204/4308* (2013.01)

(58) Field of Classification Search
CPC .............. B60G 3/06; B60G 2204/4308; B60G 2204/149; B60G 2300/07; B60G 2206/50
See application file for complete search history.

(56) References Cited

U.S. PATENT DOCUMENTS

| 8,764,039 B2* | 7/2014 | Keller | B60G 7/001 280/124.128 |
| 10,591,003 B2* | 3/2020 | Mansfield | F16D 65/0068 |
| 2005/0167179 A1* | 8/2005 | Hasegawa | B60G 3/20 180/348 |
| 2008/0179853 A1* | 7/2008 | Kuwabara | B60G 3/20 280/124.134 |
| 2008/0238078 A1* | 10/2008 | Seki | B60S 1/685 280/855 |
| 2014/0103627 A1 | 4/2014 | Deckard et al. | |

(Continued)

FOREIGN PATENT DOCUMENTS

| FR | 3089457 A1 * | 6/2020 | ............... B60G 3/06 |
| JP | 54-140409 | 9/1979 | |
| WO | WO-2016087732 A1 * | 6/2016 | ............... F16C 11/06 |

OTHER PUBLICATIONS

Kit Rear Lower Mud Flaps Reinforced. Datasheet [online], XRW Racing Parts, Jul. 27, 2019 [retrieved on Mar. 22, 2021], Retrieved from the Internet: <URL: https://xrw.pt/en/932-mud-flaps>. (Year: 2019).*

(Continued)

Primary Examiner — James A English
Assistant Examiner — Kurtis Nielson
(74) Attorney, Agent, or Firm — Wenderoth, Lind & Ponack, L.L.P.

(57) ABSTRACT

A protection device of a vehicle suspension device includes a vehicle body frame, a wheel, a knuckle that rotatably supports the wheel, a suspension arm that connects the vehicle body frame and the knuckle and is configured to be swingable up and down along with up-and-down movement of the wheel with an end portion attached to the vehicle body frame being a pivot point, a shock absorber that has an upper end attached to the vehicle body frame and a lower end attached to the suspension arm, and is configured to buffer swinging movement in an up-and-down direction of the suspension arm, and an absorber cover attached to the suspension arm and covering a periphery of the shock absorber.

12 Claims, 7 Drawing Sheets

(56) References Cited

U.S. PATENT DOCUMENTS

| | | | |
|---|---|---|---|
| 2015/0210234 A1* | 7/2015 | Kuwabara | F16C 11/06 |
| | | | 180/346 |
| 2018/0264902 A1* | 9/2018 | Schroeder | B60G 7/02 |
| 2019/0367086 A1* | 12/2019 | De Grammont | B60K 17/20 |
| 2020/0025275 A1* | 1/2020 | Schroeder | F16D 3/841 |
| 2020/0130450 A1* | 4/2020 | Nakashima | B60G 11/58 |
| 2020/0361265 A1* | 11/2020 | Czajkowski | B60G 3/06 |
| 2021/0031580 A1* | 2/2021 | Booth | B60G 3/26 |

OTHER PUBLICATIONS

Can-Am Maverick X3, X DS, X-RS Trailing Arm Guards. Datasheet [online], RokBlokz, Jul. 20, 2019 [retrieved on Mar. 22, 2021], Retrieved from the Internet: <URL: https://rokblokz.com/collections/utv-mud-flaps-1/products/can-am-maverick-x3-x-ds-x-rs-trailing-arm-guards (Year: 2019).*

* cited by examiner

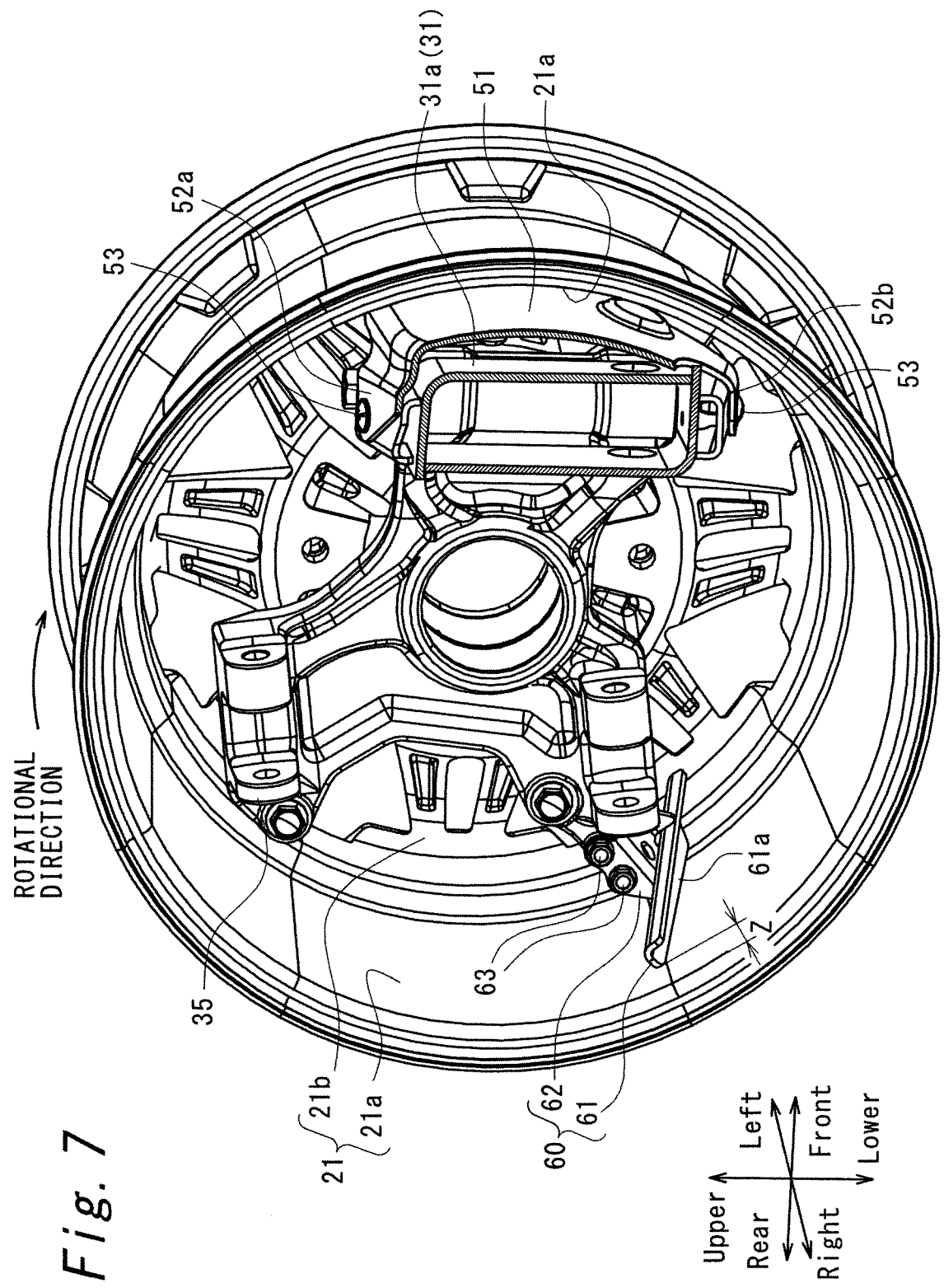

PROTECTION STRUCTURE FOR VEHICLE SUSPENSION DEVICE

BACKGROUND OF THE INVENTION

Field of the Invention

The present invention relates to a protection structure for a vehicle suspension device.

Description of the Related Art

JP 54-140409 Y discloses a vehicle suspension device in which a cover is attached to a shock absorber. The shock absorber includes a shock absorber main body and a coil spring disposed concentrically on the outer diameter side. The cover is located on the inner peripheral side of the coil spring, and is attached to a rod, of the shock absorber main body, extending from the cylinder so as to freely protrude and retract. The cover prevents mud, stones, sand, and the like wound up from the road surface from colliding with the rod of the shock absorber main body.

SUMMARY OF THE INVENTION

Since the cover is provided on the inner peripheral side of the coil spring, it is impossible to prevent collision of mud, stones, and the like wound up from the road surface with the coil spring. Furthermore, in order to detach the cover, it is necessary to remove the coil spring from the shock absorber, which requires labor for maintenance.

An object of the present invention is to provide a protection structure for a vehicle suspension device that can improve the maintainability while improving the protection performance with respect to the vehicle suspension device.

In order to achieve the above object, the present invention provides a protection structure for a vehicle suspension device that includes
a vehicle body frame;
a wheel;
a knuckle that rotatably supports the wheel;
a suspension arm connecting the vehicle body frame and the knuckle, the suspension arm being configured to be swingable up and down along with up-and-down movement of the wheel with an end portion attached to the vehicle body frame being a pivot point;
a shock absorber that has an upper end attached to the vehicle body frame and a lower end attached to the suspension arm, and buffers swinging movement of the suspension arm; and an absorber cover that is attached to the suspension arm and covers the periphery of the shock absorber.

According to the present invention, the absorber cover is attached not to the shock absorber but to the suspension arm. With the absorber cover, it is easy to cover the shock absorber over a wide range from the outer peripheral side, and to prevent collision of mud, stones, sand, and the like wound up from the road surface. In addition, since the absorber cover swings along with the suspension mechanism, it is easy to suppress interference with the suspension mechanism. Furthermore, since the absorber cover can be easily attached and detached without removing the shock absorber, the maintainability is good.

For example, the shock absorber may have a cylinder disposed on the upper side, and a rod extending from the cylinder to the lower side in the axial direction so as to freely protrude and retract.

The absorber cover may have an upper end corresponding at least to a range over the lower end of the cylinder in a 1G state.

According to this configuration, it is easy to prevent the rod from being damaged with the absorber cover.

For example, the wheel may be a rear wheel, and
the absorber cover may cover the periphery of the shock absorber from the front side.

According to this configuration, the absorber cover can easily prevent mud, stones, sand, and the like, wound up by the front wheel, from colliding with the shock absorber for the rear wheel.

For example, the shock absorber may have an absorber main body and a coil spring disposed concentrically on the outer diameter side of the absorber main body, and
the absorber cover may be located radially outside the coil spring.

According to this configuration, the absorber cover can protect not only the absorber main body but also the coil spring from mud, stones, sand and the like wound up from the road surface.

For example, the absorber cover may include a cover fixing portion to be attached to the suspension arm, and
the cover fixing portion may be provided over a half or more of the total length of the absorber cover.

According to this configuration, since the cover fixing portion is provided over a half or more of the full length of the shock absorber, it is easy to ensure the support rigidity. Accordingly, even when mud, stones, sand, and the like wound up from the road surface collide with the shock absorber cover, deformation of the absorber cover is likely to be suppressed, and the periphery of the shock absorber is easily covered in a reliable manner.

For example, the wheel may include a wheel part and a tire assembled on the outer peripheral side of the wheel part,
the suspension arm may have a tip positioned radially inside the wheel part, and
a wheel inner cover that faces the inner peripheral surface of the wheel part and forms a closed space with the tip may be attached to the tip of the suspension arm.

According to this configuration, the open space opened to the outside between the tip of the suspension arm and the inner peripheral surface of the wheel part can be reduced by the wheel inner cover. As a result, it is easy to prevent mud, stones, sand, and the like, wound up from the road surface, from entering the open space.

For example, the wheel may be a rear wheel,
the suspension arm may extend in the front-rear direction, and the knuckle may be attached to the rear end, and
a mud flap extending downward may be attached to the lower side of the suspension arm in front of the wheel.

According to this configuration, with the mud flap, it is easy to prevent mud, stones, sand, and the like, wound up from the road surface by the front wheel, from scattering to the wheel part side of the rear wheel. In addition, compared with the case where a mud flap is provided immediately behind the front wheel, it is easier to prevent interference between the front wheel and the mud flap and to ensure the steering angle of the front wheel.

For example, the wheel may have a wheel part and a tire assembled on the outer peripheral side of the wheel part,
a scraper extending in the tire width direction along the inner peripheral surface of the wheel part may be attached to the knuckle, and
the scraper may be inclined in the rotational direction of the wheel when the vehicle moves forward, toward the inner side in the vehicle width direction.

According to this configuration, it is easy to scrape out mud, stones, sand, and the like that have entered the wheel part, to the inside in the vehicle width direction by the scraper. Thereby, it is easy to suppress accumulation of mud, stones, sand, and the like, wound up from the road surface, in the wheel part.

BRIEF DESCRIPTION OF THE DRAWINGS

The foregoing and the other features of the present invention will become apparent from the following description and drawings of an illustrative embodiment of the invention in which:

FIG. 7 is a cross-sectional view taken along line VII-VII of FIG. 6.

DETAILED DESCRIPTION OF THE INVENTION

Hereinafter, a utility vehicle according to an embodiment of the present invention will be described with reference to the accompanying drawings. For the sake of explanation, a traveling direction of a utility vehicle is assumed to be the "front" of the utility vehicle and the respective components, and left and right directions when an occupant on the utility vehicle looks ahead are assumed to be "left and right". Further, all the accompanying drawings show a state where the front wheels and the rear wheels are not swung up and down (also referred to as a 1G state).

Figure 1:
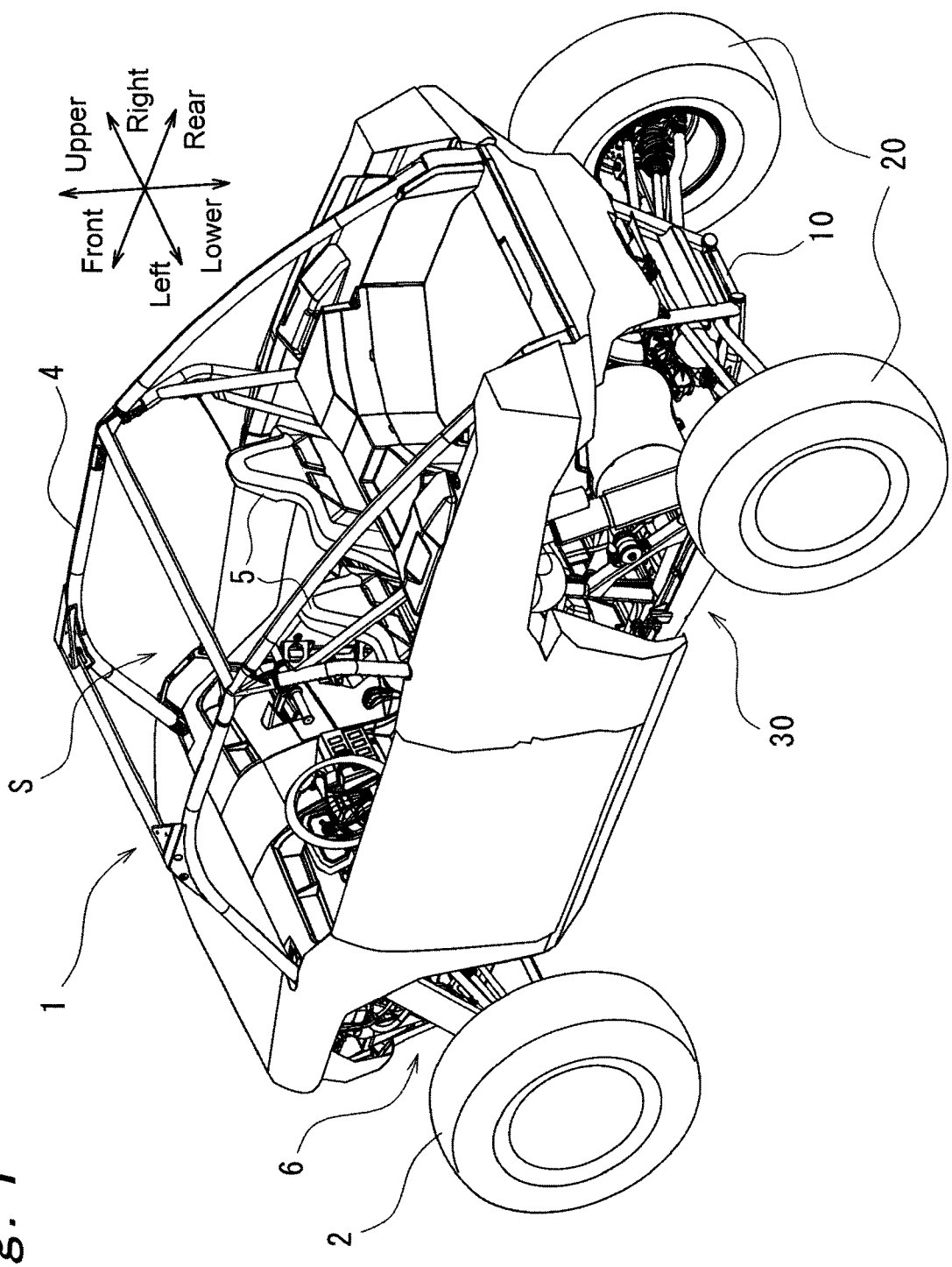
FIG. 1 is a perspective view of a utility vehicle according to an embodiment of the present invention.

FIG. 1 is a perspective view of a utility vehicle 1 according to an embodiment of the present invention as viewed from the rear. As shown in FIG. 1, the utility vehicle 1 includes a vehicle body frame 10 extending in the front-rear direction, a pair of left and right front wheels 2 disposed on both sides of the front end of the vehicle body frame 10, a pair of left and right rear wheels 20 disposed on both sides of the rear end of the vehicle body frame 10, and a Rollover Protective Structure (ROPS) 4 connected to the upper part of the vehicle body frame 10. In the utility vehicle 1, a riding space S surrounded by the ROPS 4 is configured between the front wheels 2 and the rear wheels 20. In the riding space S, a pair of left and right front seats 5 is disposed.

The front wheels 2 are supported to be swingable up and down with respect to the vehicle body frame 10 via a front wheel suspension device 6. The rear wheels 20 are supported to be swingable up and down with respect to the vehicle body frame 10 via a rear wheel suspension device 30 (hereinafter referred to as a suspension device).

Figure 2:
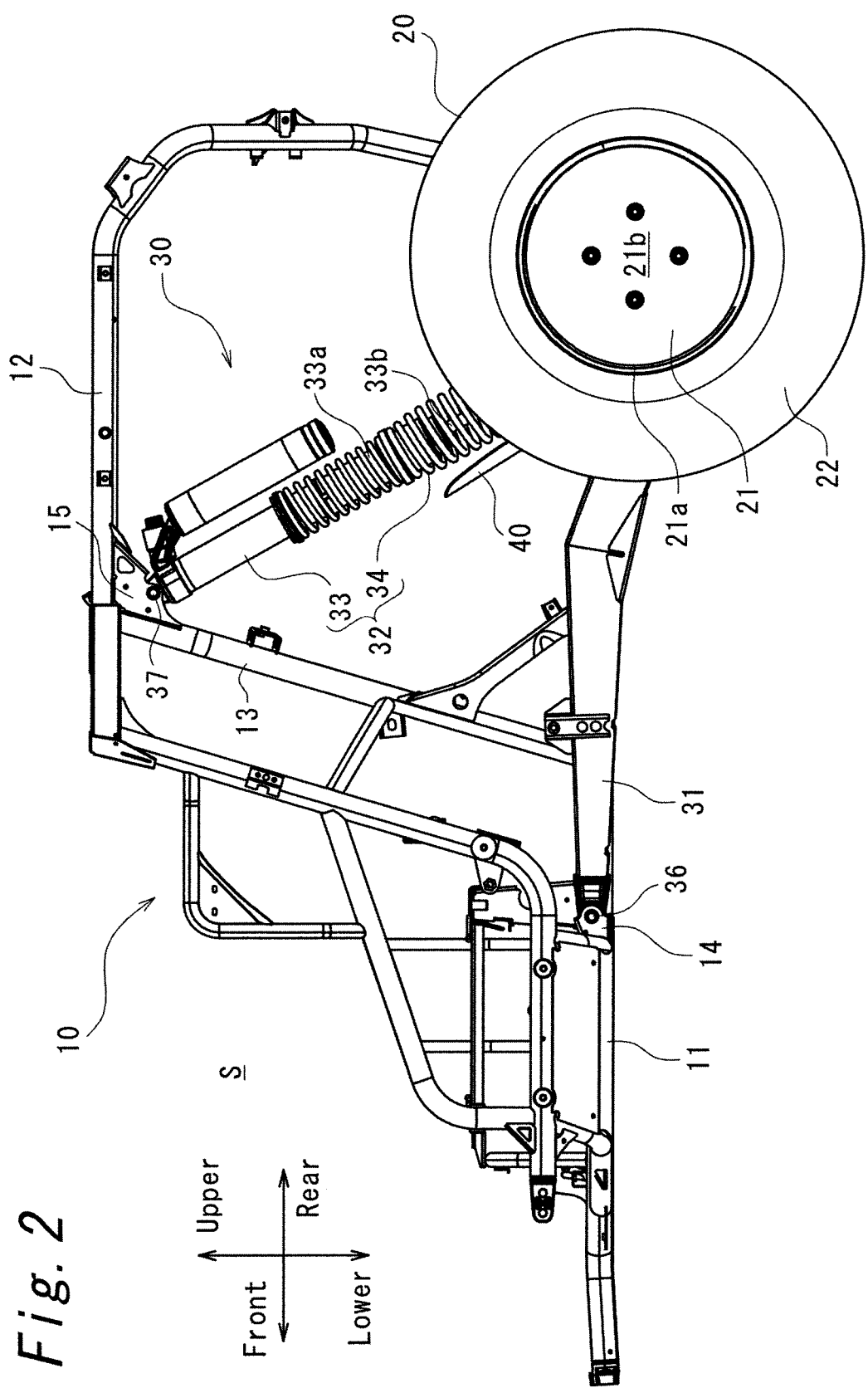
FIG. 2 is a side view of a vehicle body frame showing the periphery of a rear suspension.

FIG. 2 is a side view showing the rear part of the vehicle body frame 10, and the rear wheel 20 and the rear wheel suspension device 30 are shown together. As shown in FIG. 2, the vehicle body frame 10 includes a bottom main frame 11 that extends in the front-rear direction at the bottom of the vehicle body, an upper main frame 12 that extends in the front-rear direction above the rear wheel 20 behind the riding space S, and an up-down connecting frame 13 that connects the bottom main frame 11 and the upper main frame 12 up and down in front of the rear wheel 20.

An arm support portion 14 that supports a front end of a trailing arm 31, described later, is connected to a substantially intermediate position in the front-rear direction of the bottom main frame 11 by welding. Over the joint portion between the upper main frame 12 and the up-down connecting frame 13, an absorber support portion 15 that supports an upper end of an absorber main body 33, described later, is connected by welding.

Figure 3:
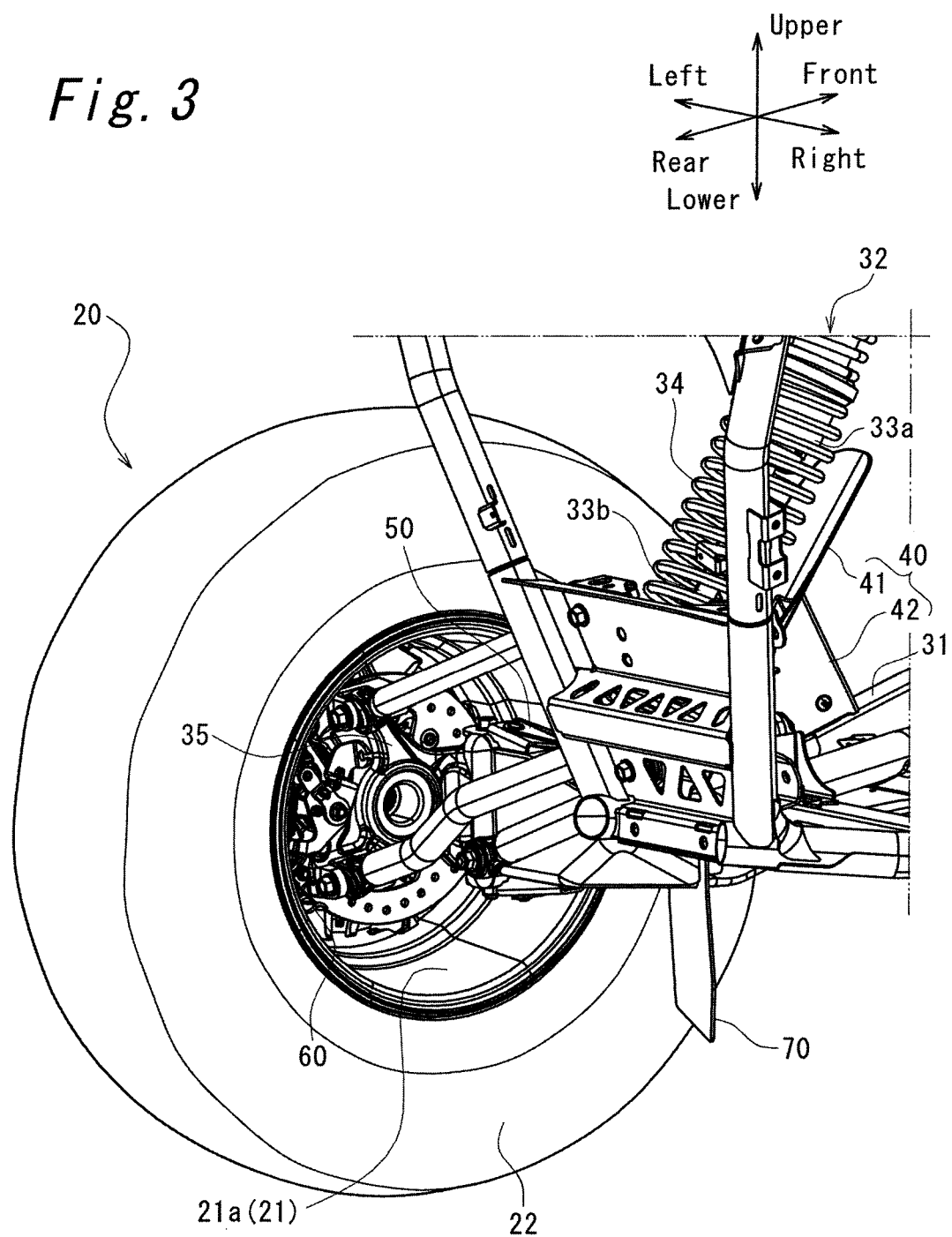
FIG. 3 is a perspective view of the periphery of a rear wheel as viewed from the rear.

FIG. 3 is a perspective view of the periphery of the left rear wheel 20 as viewed from the rear. Referring also to FIG. 3, the suspension device 30 includes the trailing arm 31 (see FIG. 2), a shock absorber 32 (see FIG. 2), and a knuckle 35 (see FIG. 3).

As shown in FIG. 2, the trailing arm 31 extends rearward from the front end connected to the arm support portion 14. Specifically, the trailing arm 31 is configured such that the front end is pivotally supported with respect to the arm support portion 14 via a first pivot shaft 36 extending in the vehicle width direction, and that the rear end is swingable up and down. That is, the trailing arm 31 is configured such that the rear part is swingable in the vertical direction with the front end being the pivot point. As shown in FIG. 3, the trailing arm 31 is curved outward in the vehicle width direction in the rear portion, and is connected to the knuckle 35 on the inner peripheral side of the rear wheel 20. That is, the rear end of the trailing arm 31 is located inside the rear wheel 20.

The shock absorber 32 extends in an inclined direction to the front toward the above, and has the absorber main body 33 and a coil spring 34. The absorber main body 33 includes a cylinder 33a positioned above, and a rod 33b provided so as to be able to protrude and retract from the cylinder 33a to the lower side in the axial direction.

The cylinder 33a is of a hydraulic type, and attenuates the vertical vibration of the rear wheel 20 input via the rod 33b. The cylinder 33a has an upper end which is pivotally supported with respect to the absorber support portion 15 via a second pivot shaft 37 extending in the vehicle width direction. The rod 33b has tip (lower end) is pivotally supported with respect to the upper portion of the rear portion of the trailing arm 31 via a third pivot shaft 38 (see FIG. 5) extending in the vehicle width direction.

The coil spring 34 is disposed concentrically on the outer diameter side of the absorber main body 33, and is elastically provided between the cylinder 33a and the tip portion of the rod 33b. The coil spring 34 elastically resists the swinging motion in the vertical direction of the trailing arm 31. That is, the shock absorber 32 buffers the swinging motion of the trailing arm 31.

Figure 4:
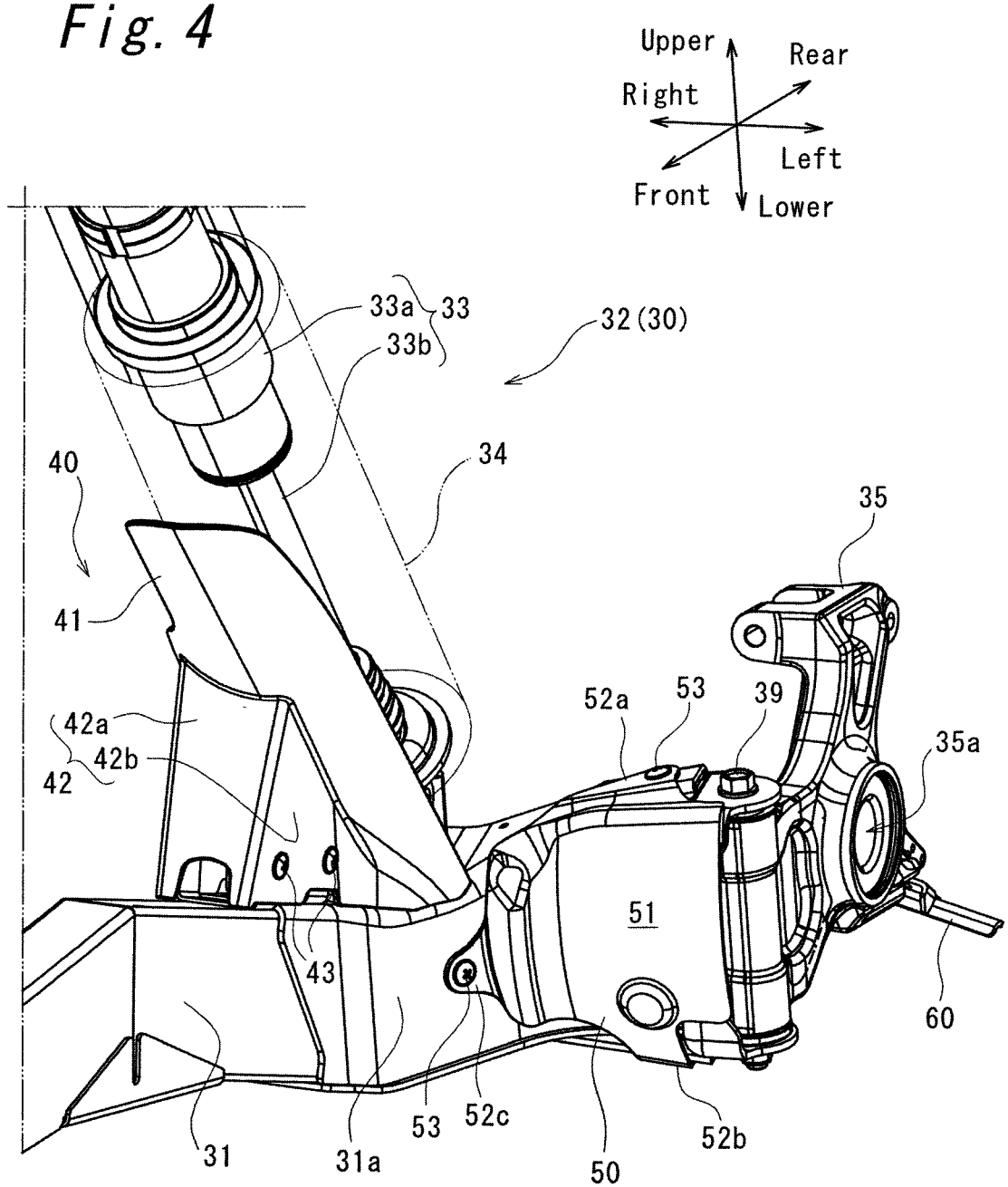
FIG. 4 is a perspective view of the periphery of a trailing arm as viewed from the front.
Figure 5:
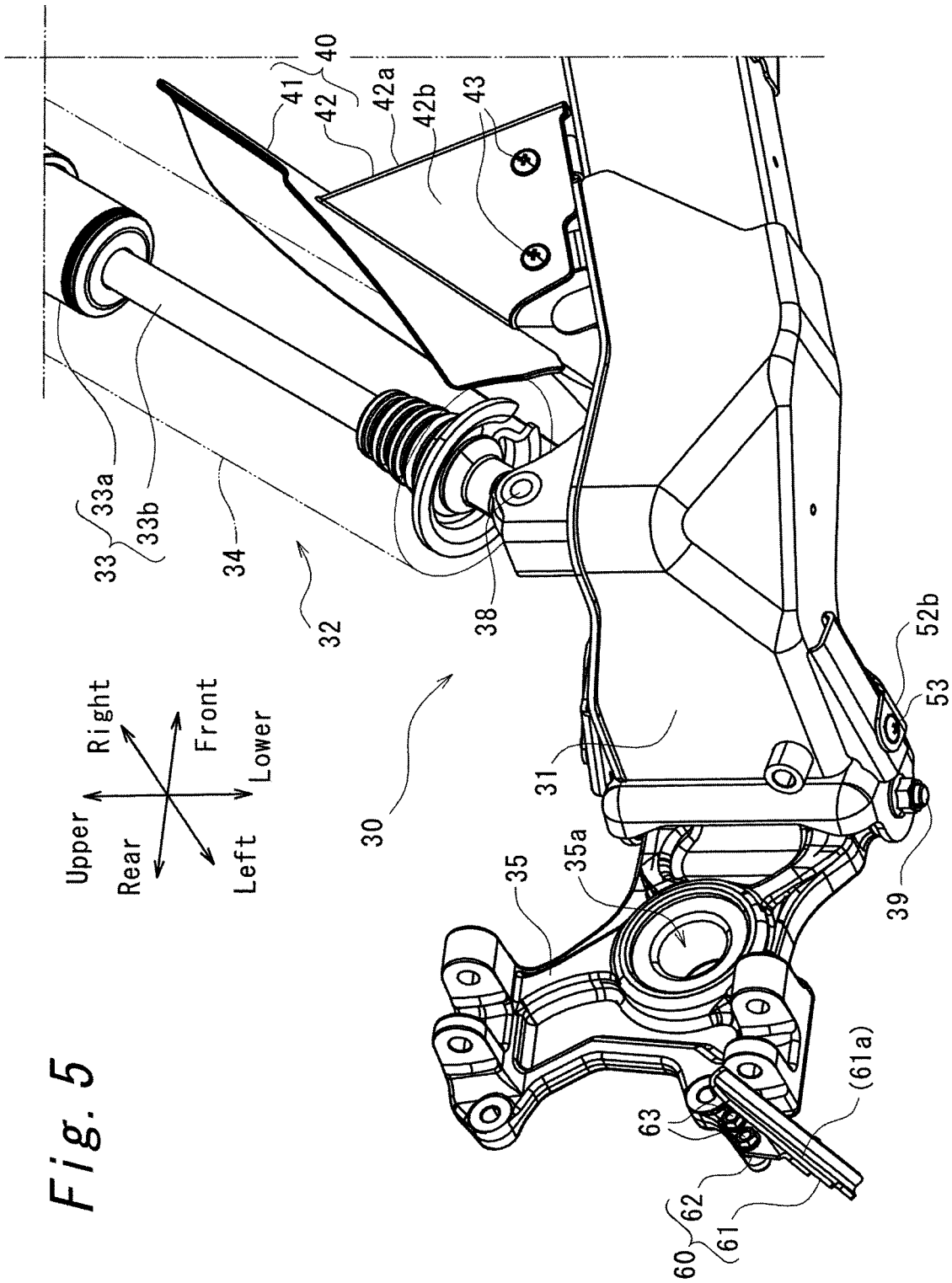
FIG. 5 is a perspective view of the periphery of the trailing arm as viewed from the rear.

FIG. 4 is a perspective view of the left suspension device 30 as viewed from the front, and FIG. 5 is a perspective view of the left suspension device 30 as viewed from the rear. In FIGS. 4 and 5, the coil spring 34 is shown as a cylindrical body by a virtual line.

As shown in FIGS. 4 and 5, the knuckle 35 is pivotally supported at the front end thereof with respect to the rear end of the trailing arm 31 via a fourth pivot shaft 39 extending in the upper-lower direction. The knuckle 35 extends in the front-rear direction, and a through hole 35a penetrating in the vehicle width direction is formed in a substantially central portion in the front-and-rear direction. A hub (not shown) is rotatably journaled in the through hole 35a, and the rear wheel 20 (see FIG. 1) is attached to the hub.

As shown in FIG. 3, the rear wheel 20 includes a wheel part 21 and a tire 22 assembled to the outer periphery of the wheel part 21. The wheel part 21 includes a cylindrical rim portion 21a and a disk portion 21b (see FIG. 2) that separates the inner peripheral portion of the rim portion 21a in the vehicle width direction. The rear wheel 20 is attached to the hub at a disk portion 21b of the wheel part 21.

The suspension device 30 includes a cover that prevents the suspension device 30 from collision of mud, stones, sand, and the like wound up from the road surface. Hereinafter, the cover will be described in detail.

As shown in FIG. 4, the cover includes an absorber cover 40 that covers the shock absorber 32 from the front, a wheel inner cover 50 that covers the rear end of the trailing arm 31 from the front, and a scraper 60 attached to the rear end of the knuckle 35. Also, as shown in FIG. 3, the cover includes a mud flap 70 attached below the trailing arm. In the present embodiment, each of the covers 40, 50, 60, and 70 is made of resin, but is not limited thereto, and may be made of metal, for example.

(Absorber Cover)

As shown in FIGS. 4 and 5, the absorber cover 40 includes an absorber cover main body 41 and an absorber cover fixing portion 42. The absorber cover main body 41 extends parallel to the shock absorber 32 in an inclined direction to the front toward the above, and is formed to cover the rod 33b from the front corresponding at least to a range from the upper surface of the trailing arm 31 to the lower end of the cylinder 33a of the absorber main body 33 in the 1G state in the upper-lower direction. The absorber cover fixing portion 42 is formed over substantially the lower half of the absorber cover main body 41 and extends downward from the absorber cover main body 41.

The absorber cover main body 41 has a horizontal cross-sectional shape that is formed in a semicircular shape (also referred to as a U-shape) with a rear opening so as to cover the front side of the shock absorber 32 with a gap at the lower end. The dimension in the vehicle width direction gradually decreases toward the upper side. The upper end of the absorber cover main body 41 is formed in a size substantially corresponding to the dimension in the vehicle width direction of the shock absorber 32.

That is, the absorber cover main body 41 has a lower side that is supported by the absorber cover fixing portion 42 and is formed to be relatively large in the vehicle width direction, and has an upper side that is positioned above the absorber cover fixing portion 42 in a cantilevered state and is formed relatively small in the vehicle width direction. This enhances the performance of protecting the shock absorber 32 while ensuring the strength of the absorber cover 40.

The absorber cover fixing portion 42 includes a front surface portion 42a that extends downward from a substantially central portion in the upper-lower direction of the absorber cover main body 41 and faces the front-rear direction, and a pair of side surface portions 42b that extend rearward from both sides of the front surface portion 42a in the vehicle width direction and have upper portions connected to the absorber cover main body 41. The absorber cover fixing portion 42 is different from the absorber cover main body 41 extending in an inclined direction to the front toward the above, and extends downwardly from the absorber cover main body 41. That is, the absorber cover fixing portion 42 is configured so that a protrusion amount to the front with respect to the absorber cover main body 41 increases toward the lower side. In other words, the absorber cover fixing portion 42 is configured so that a width in a front-rear direction increases toward the lower side, which effectively enhances support rigidity for the absorber cover main body 41 in the front-rear direction. As a result, durability of the absorber cover 40 is improved in case where mud and the like adheres to the absorber cover 40.

The absorber cover 40 is fastened and detachably fixed to the upper portion of the trailing arm 31 by fastening members 43 at a pair of side surface portions 42b of the absorber cover fixing portion 42. In case where the absorber cover 40 is fixed not to the trailing arm 31 but directly to the absorber 32, the absorber cover fixing portion 42 is formed along with the shock absorber 32, thus the absorber cover cannot be formed larger in front-rear direction, which result in being not likely to enhance support rigidity. Therefore, in case where mud and the like adheres to the absorber cover 40, the absorber cover 40 is likely to be damaged due to a weight of the mud and the like.

The absorber cover 40 prevents mud, stones, sand, and the like that have been wound up from the road surface from colliding with and adhering to the shock absorber 32. Specifically, the absorber cover 40 suppresses collision and adhesion of mud, stones, sand, and the like to the rod 33b protruding downward from the cylinder 33a of the absorber main body 33, and also suppresses collision and adhesion of mud, stones, sand, and the like to the coil spring 34 positioned on the outer peripheral side of the rod 33b.

(Wheel Inner Cover)

Figure 6:
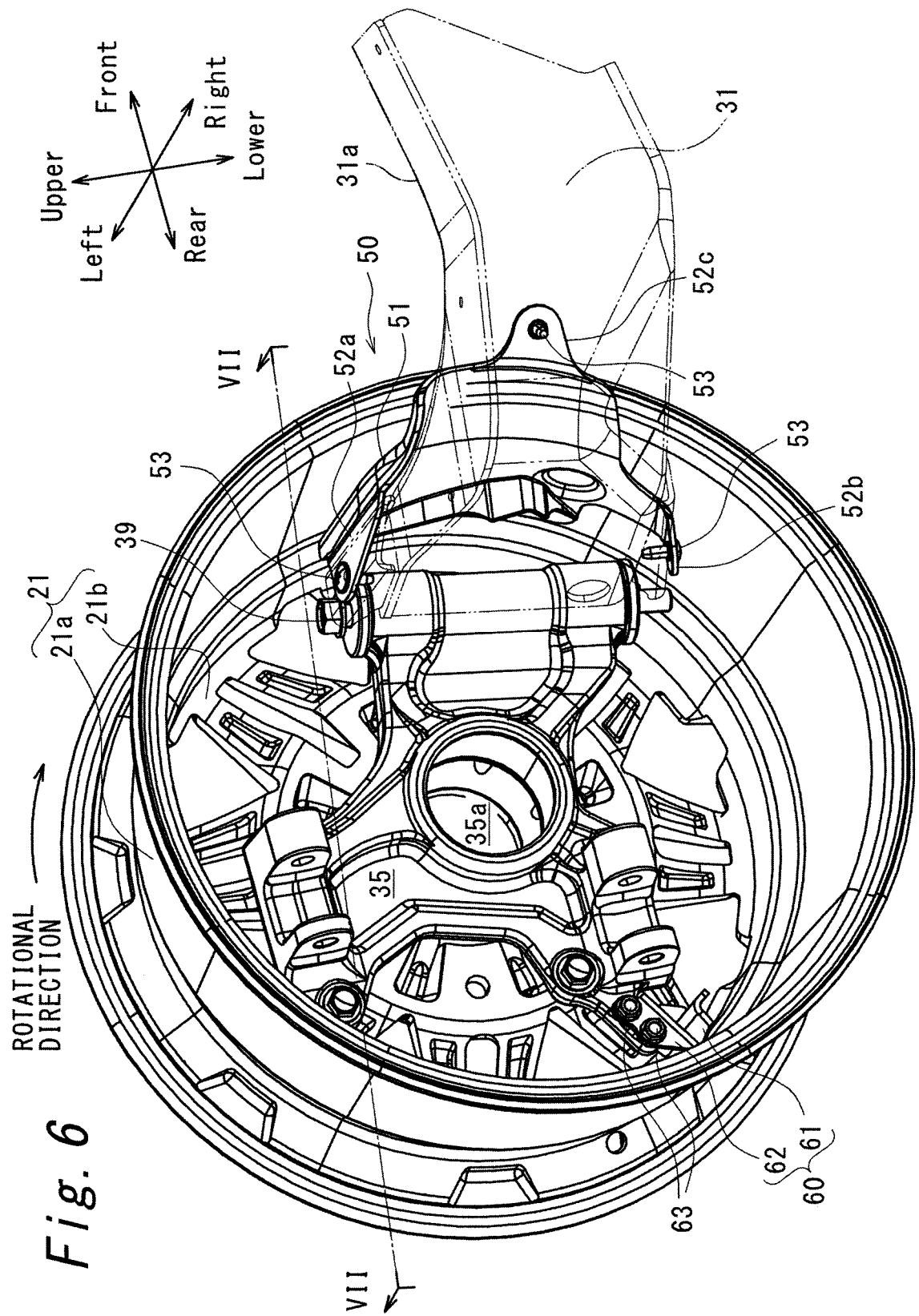
FIG. 6 is a perspective view of the inner side of a wheel part of a rear wheel as viewed from the rear.

FIG. 6 is a perspective view of the periphery of the left rear wheel 20 as viewed from the rear, and FIG. 7 is a cross-sectional view taken along line VII-VII in FIG. 6, showing a cross-section taken by cutting the rear end of the trailing arm 31 along a plane orthogonal to the vehicle wide direction. In both FIGS. 6 and 7, the tire 22 is omitted. In FIG. 6, the trailing arm 31 is shown in a transmissive state. As shown in FIGS. 6 and 7, the wheel inner cover 50 includes a wheel inner cover main body 51 and a wheel inner cover fixing portion 52.

The wheel inner cover main body 51 is located between the trailing arm 31 and a rim portion 21a of the wheel part 21. As shown in FIG. 7, the wheel inner cover main body 51 is formed in an arc shape in which a cross-sectional shape perpendicular to the vehicle width direction is convex forward, and faces the rim portion 21a of the wheel part 21 so as to be along the rim portion 21a from the inner diameter side with a substantially constant interval of 10 mm to 20 mm.

As shown in FIG. 6, the wheel inner cover fixing portion 52 constitutes a fixing portion for fixing the wheel inner cover main body 51 to the trailing arm 31, and includes an upper flange 52a fixed to the upper portion of the trailing arm 31, a lower flange 52b fixed to the lower portion of the trailing arm 31, and a side flange 52c fixed to the outer side of the trailing arm 31 in the vehicle width direction.

The upper flange 52a is bent from the upper edge of the wheel inner cover main body 51 and extends rearward. The lower flange 52b is bent from the lower edge of the wheel inner cover main body 51 and extends rearward. The side flange 52c extends along the side wall 31a of the trailing arm 31 from the inner end in the vehicle width direction of the wheel inner cover main body 51. In the wheel inner cover fixing portion 52, the wheel inner cover 50 is fastened and detachably fixed to the rear end of the trailing arm 31 by a fastening member 53.

That is, a closed space is formed between the trailing arm 31 and the wheel inner cover 50 attached to the rear end of the trailing arm 31. As a result, the open space defined between the trailing arm 31 and the rim portion 21a of the wheel part 21 and opened to the outside is reduced in the closed space by the wheel inner cover 50. That is, the open space between the trailing arm 31 and the rim portion 21*a* is filled (reduced) with the wheel inner cover 50.

Since the open space between the trailing arm 31 and the rim portion 21*a* is filled with (reduced by) the wheel inner cover 50, intrusion of mud, stones, sand, and the like into the open space is suppressed.

Further, as shown in FIG. 7, in the trailing arm 31, the side wall 31*a* facing the rim portion 21*a* extends in the upper-lower direction. On the other hand, since the rim portion 21*a* is cylindrical, the distance in the front-rear direction of the open space between the side wall 31*a* and the rim portion 21*a* decreases as it goes downward. In contrast, by attaching the wheel inner cover 50 to the trailing arm 31, the open space is configured to be substantially constant distance.

That is, the open space between the trailing arm 31 and the rim portion 21*a* decreases in the rotational direction of the rim portion 21*a* when the utility vehicle 1 moves forward. In this case, mud, stones, sand, and the like that have entered between the trailing arm 31 and the rim portion 21*a* are likely to be accumulated at the lower end of the open space where the front-rear gap decreases as the rim portion 21*a* rotates. However, by attaching the wheel inner cover 50 to the trailing arm 31, the open space inside the rim portion 21*a* is configured at a substantially constant distance, so that it is likely to suppress accumulation of mud, stones, sand, and the like that may enter the open space.

(Scraper)

As shown in FIG. 7, the scraper 60 includes a scraper main body 61 and a scraper fixing portion 62. The scraper main body 61 includes a blade 61*a* that faces the inner peripheral surface of the rim portion 21*a* of the wheel part 21 via a gap of 5 mm to 10 mm, and extends in the tire width direction along the rim portion 21*a* substantially perpendicular to the circumferential direction. The blade 61*a* is inclined in the rotational direction of the rim portion 21*a* when the utility vehicle 1 moves forward, toward the inside in the vehicle width direction.

One end of the scraper fixing portion 62 is detachably fixed to the knuckle 35 by a fastening member 63, and the scraper main body 61 is fixed to the other end by welding, for example.

By the scraper 60, mud, stones, sand, and the like adhering to the inner peripheral portion of the rim portion 21*a* of the wheel part 21 can be scraped out. In particular, since the blade 61*a* is inclined in the rotational direction of the rim portion 21*a* toward the inside in the vehicle width direction, mud, stones, sand, and the like adhering to the rim portion 21*a* are easily scraped out to the inside in the vehicle width direction and discharged from the rim portion 21*a*, as the rim portion 21*a* rotates.

(Mad Flap)

As shown in FIG. 3, a mud flap 70 extends downward from the trailing arm 31 in front of the rim portion 21*a* inside the rear wheel 20 in the vehicle width direction. The mud flap 70 is fastened and detachably fixed to a lower portion of the trailing arm 31 by a fastening member (not shown).

The mud flap 70 prevents mud, stones, sand, and the like, wound up from the road surface, from entering the rim portion 21*a* of the wheel part 21.

The utility vehicle 1 according to the above-described embodiment has the following effects.

(1) The absorber cover 40 is attached not to the shock absorber 32 but to the trailing arm 31. By the absorber cover 40, it is easy to cover the shock absorber 32 in a wide range from the outer peripheral side, and it is easy to prevent collision of mud, stones, sand, and the like wound up from the road surface. In addition, since the absorber cover 40 swings along with the suspension device 30, it is easy to suppress interference with the suspension device 30. Furthermore, since the absorber cover 40 can be easily attached and detached without removing the shock absorber 32, maintainability is good.

(2) Since the upper end of the absorber cover 40 corresponds at least to the range extending over the lower end of the cylinder 33*a* in the 1G state, the absorber cover 40 can easily prevent the rod 33*b* from being damaged.

(3) Since the absorber cover 40 covers the periphery of the shock absorber 32 from the front side, mud, stones, sand, and the like, wound up by the front wheel 2, are likely to be prevented from colliding with the shock absorber 32 for the rear wheel 20.

(4) The shock absorber 32 has a coil spring 34 arranged coaxially, and the absorber cover 40 is located radially outside the coil spring 34. Therefore, not only the absorber main body 33 but also the coil spring 34 can be protected from mud, stones, sand and the like wound up from the road surface, by the absorber cover 40.

(5) The absorber cover fixing portion 42 is provided over a half or more of the entire length of the absorber cover main body 41. As a result, the absorber cover fixing portion 42 is provided over a half or more of the entire length of the shock absorber 32, so that it is easy to ensure support rigidity. Accordingly, even when mud, stones, sand, and the like, wound up from the road surface, collide with the absorber cover 40, deformation of the absorber cover 40 is likely to be suppressed, and it is easy to cover the periphery of the shock absorber 32 reliably.

(6) The open space between the rear end of the trailing arm 31 and the inner peripheral surface of the rim portion 21*a* of the wheel part 21 can be filled with the wheel inner cover. This makes it easy to prevent mud, stones, sand, and the like wound from the road surface from entering the open space between the trailing arm 31 and the rim portion 21*a*.

(7) The mud flap 70 makes it easy to prevent mud, stones, sand, and the like wound up from the road surface by the front wheel 2 from scattering to the rear wheel 20 side. In addition, it is easier to prevent interference between the front wheel 2 and the mud flap and to secure the steering angle of the front wheel 2, compared with the case where a mud flap is provided immediately behind the front wheel.

(8) Since the scraper 60 is inclined in the rotational direction of the wheel when the vehicle is moving forward, toward the inside in the vehicle width direction, mud, stones, sand, and the like adhering to the rim portion 21*a* of the wheel part 21 are easily scraped out to the inside in the vehicle width direction by the blade 61*a* of the scraper 60. Thereby, it is easy to suppress accumulation of mud, stones, sand, and the like wound up from the road surface, on the rim portion 21*a* of the wheel part 21.

In the above embodiment, the case where the absorber cover 40 is attached to the trailing arm 31 has been described as an example, but the present invention is not limited to this. The absorber cover 40 may be attached to various suspension arms other than the trailing arm 31 that support the suspension device 30.

In the above-described embodiment, the absorber cover fixing portion 42 is provided corresponding to the lower half of the absorber cover main body 41, but is not limited thereto. The absorber cover fixing portion 42 may be provided over a half or more of the entire length of the absorber cover main body 41, and may be provided corresponding to, for example, a center portion in the upper-lower direction or the upper half of the absorber cover main body 41.

Various modifications and alterations can be made without departing from the spirit and scope of the present invention described in the claims.

What is claimed is:

1. A protection structure for a vehicle suspension device, the protection structure comprising:
 a vehicle body frame;
 a wheel;
 a knuckle that rotatably supports the wheel;
 a suspension arm connecting the vehicle body frame and the knuckle, the suspension arm being configured to be swingable up and down along with up-and-down movement of the wheel with an end portion attached to the vehicle body frame being a pivot point;
 a shock absorber that has an upper end attached to the vehicle body frame and a lower end attached to the suspension arm, and is configured to buffer swinging movement in an up-and-down direction of the suspension arm; and
 an absorber cover attached to the suspension arm and covering a periphery of the shock absorber,
 wherein the absorber cover includes:
 a cover main body portion; and
 a cover fixing portion attached onto an upper surface of the suspension arm, the cover fixing portion being provided on a front lower portion of the cover main body portion.

2. The protection structure according to claim 1, wherein:
 the shock absorber includes a cylinder disposed on an upper side, and a rod extending from the cylinder to a lower side in an axial direction of the cylinder so as to freely protrude and retract; and
 the absorber cover has an upper end that corresponds at least to a range over a lower end of the cylinder in a 1G state.

3. The protection structure according to claim 1, wherein:
 the wheel is a rear wheel; and
 the absorber cover covers the periphery of the shock absorber from a front side.

4. The protection structure according to claim 1, wherein:
 the shock absorber includes an absorber main body and a coil spring disposed concentrically on an outer diameter side of the absorber main body; and
 the absorber cover is located radially outside the coil spring.

5. The protection structure according to claim 1, wherein:
 the cover fixing portion is provided over a half or more of a total length of the absorber cover.

6. The protection structure according to claim 1, wherein:
 the wheel includes a wheel part and a tire on an outer peripheral side of the wheel part;
 the suspension arm has a tip positioned radially inside the wheel part; and
 the tip of the suspension arm is provided with a wheel inner cover that faces an inner peripheral surface of the wheel part and forms a closed space with the tip of the suspension arm.

7. The protection structure according to claim 1, wherein:
 the wheel is a rear wheel;
 the suspension arm extends in a front-rear direction, and the knuckle is attached to a rear end of the suspension arm; and
 a mud flap extending downward is attached to a lower side of the suspension arm in front of the wheel.

8. The protection structure according to claim 1, wherein:
 the wheel includes a wheel part and a tire on an outer peripheral side of the wheel part;
 a scraper extending in a tire width direction along an inner peripheral surface of the wheel part is attached to the knuckle; and
 the scraper is inclined in a rotational direction of the wheel when a vehicle moves forward, toward an inner side in a vehicle width direction.

9. A protection structure for a vehicle suspension device, the protection structure comprising:
 a vehicle body frame;
 a wheel;
 a knuckle that rotatably supports the wheel;
 a suspension arm connecting the vehicle body frame and the knuckle, the suspension arm being configured to be swingable up and down along with up-and-down movement of the wheel with an end portion attached to the vehicle body frame being a pivot point;
 a shock absorber that has an upper end attached to the vehicle body frame and a lower end attached to the suspension arm, and is configured to buffer swinging movement in an up-and-down direction of the suspension arm; and
 an absorber cover attached to the suspension arm and covering a periphery of the shock absorber,
 wherein:
 the wheel includes a wheel part and a tire on an outer peripheral side of the wheel part;
 the wheel part has a rim portion;
 the suspension arm has a tip positioned radially inside the wheel part;
 the tip of the suspension arm is provided with a wheel inner cover that faces an inner peripheral surface of the wheel part and forms a closed space with the tip of the suspension arm; and
 the wheel inner cover is located between the tip of the suspension arm and the rim portion of the wheel part.

10. The protection structure according to claim 9, wherein:
 the wheel inner cover has a cross-sectional shape perpendicular to a vehicle width direction which is an arc shape so as to protrude forward and extend along the rim portion of the wheel part from an inner diameter side of the rim portion of the wheel part.

11. The protection structure according to claim 9, wherein:
 the wheel inner cover has an inner cover fixing portion detachably fixed to the suspension arm.

12. The protection structure according to claim 9, wherein:
 the wheel inner cover has an upper flange fixed to an upper surface of the suspension arm.

* * * * *